US007516466B2

(12) United States Patent
Blackketter et al.

(10) Patent No.: US 7,516,466 B2
(45) Date of Patent: *Apr. 7, 2009

(54) METHOD AND APPARATUS FOR RETRIEVING DATA FROM A BROADCAST SIGNAL

(75) Inventors: Dean J. Blackketter, San Francisco, CA (US); Timothy F. Park, Menlo Park, CA (US)

(73) Assignee: Microsoft Corporation, Redmond, WA (US)

( * ) Notice: Subject to any disclaimer, the term of this patent is extended or adjusted under 35 U.S.C. 154(b) by 826 days.

This patent is subject to a terminal disclaimer.

(21) Appl. No.: 10/997,429

(22) Filed: Nov. 24, 2004

(65) Prior Publication Data

US 2005/0081253 A1    Apr. 14, 2005

Related U.S. Application Data

(63) Continuation of application No. 10/869,483, filed on Jun. 16, 2004, which is a continuation of application No. 09/608,339, filed on Jun. 29, 2000, now Pat. No. 6,772,438, which is a continuation-in-part of application No. 09/412,839, filed on Oct. 5, 1999, now Pat. No. 6,415,438, which is a continuation-in-part of application No. 09/345,247, filed on Jun. 30, 1999, now Pat. No. 6,668,378.

(51) Int. Cl.
*H04N 7/16* (2006.01)
(52) U.S. Cl. ............................. 725/20; 725/31; 380/210
(58) Field of Classification Search .................. 725/32, 725/136, 109–113, 137; 384/461, 468
See application file for complete search history.

(56) References Cited

U.S. PATENT DOCUMENTS

| 6,108,706 | A | * | 8/2000 | Birdwell et al. ............. 709/229 |
| 6,400,407 | B1 | * | 6/2002 | Zigmond et al. ............ 348/465 |
| 6,415,438 | B1 | * | 7/2002 | Blackketter et al. ......... 725/136 |
| 6,460,180 | B1 | * | 10/2002 | Park et al. ..................... 725/40 |
| 6,557,172 | B1 | * | 4/2003 | Carr ........................... 725/139 |
| 6,560,777 | B2 | * | 5/2003 | Blackketter et al. ......... 725/110 |
| 6,571,392 | B1 | * | 5/2003 | Zigmond et al. ............ 725/110 |
| 6,772,438 | B1 | * | 8/2004 | Blackketter et al. ......... 725/136 |
| 2003/0126621 | A1 | * | 7/2003 | Leak et al. .................. 725/135 |
| 2003/0204854 | A1 | * | 10/2003 | Blackketter et al. ......... 725/113 |

OTHER PUBLICATIONS

"SDP; Session Description Protocol"; Network Working Group, Requst for Comments: 2327, pp. 1-42; Apr. 1998.
"Advanced Television Enhancement Forum Specification (ATVEF)", Version 1.1r26, 35 pages, Feb. 2, 1999.
Press Release: Advanced Television Enhancement Forum Releases Royalty-Free License for Development of Enhanced TV Content, 3 pages, Sep. 10, 1999, Amsterdam, Netherlands.

* cited by examiner

*Primary Examiner*—Annan Q Shang
*Assistant Examiner*—Fred Peng
(74) *Attorney, Agent, or Firm*—Lee & Hayes, PLLC

(57) ABSTRACT

A broadcast signal is received that includes a data identifier that identifies data associated with the broadcast signal. The broadcast signal also includes the data associated with the broadcast signal encoded in the broadcast signal. The data associated with the broadcast signal includes an indicator to ignore the data identifier contained in the broadcast signal. The system decodes the data encoded in the broadcast signal while ignoring the data identifier contained in the broadcast signal. The indicator to ignore the data identifier contained in the broadcast signal may include an associated time period during which the data identifier should be ignored. The data identifier is broadcast in scan line twenty-one of a broadcast image. The data associated with the broadcast signal is encoded in vertical blanking interval lines of a broadcast image.

21 Claims, 6 Drawing Sheets

METHOD AND APPARATUS FOR RETRIEVING DATA FROM A BROADCAST SIGNAL

RELATED APPLICATIONS

This application is a Continuation of co-pending application Ser. No. 10/869,483, filed Jun. 16, 2004, entitled "Method and Apparatus for Retrieving Data From a Broadcast Signal", and incorporated herein by reference. That application is a continuation of U.S. patent application Ser. No. 09/608,339, filed Jun. 29, 2000, now U.S. Pat. No. 6,772,438, which is a continuation-in-part of application Ser. No. 09/412,839, filed Oct. 5, 1999, entitled "Trigger Having A Time Attribute", now U.S. Pat. No. 6,415,438, and is a continuation-in-part of co-pending application Ser. No. 09/345,247, filed Jun. 30, 1999, entitled "Interactive Television Triggers Having Connected Content/Disconnected Content Attribute".

TECHNICAL FIELD

This invention relates to a system that retrieves data from a broadcast signal, such as a television broadcast signal.

BACKGROUND

Broadcast television in the United States is broadcast in accordance with the National Television Standards Committee (NTSC) broadcast television format standard. The NTSC broadcast format provides for the transmission of approximately thirty image frames per second. A particular frame includes two interlaced fields, in which each field includes 265½ horizontal scan lines. FIG. 1 illustrates an example television broadcast frame 10 in accordance with the NTSC standard. Broadcast frame 10 may also be referred to as a "broadcast image."

The broadcast and display of frame 10 is described in connection with a conventional analog television having a cathode ray tube (CRT) with an electron beam. A receiver portion of the television receives the broadcast NTSC signal and controls the electron beam such that the electron beam is scanned across the screen of the CRT to generate the appropriate image. The first nine horizontal scan lines (lines 1-9) of the frame 10 are used to synchronize the television receiver and to return the electron beam to the top of the screen. The electron beam is disabled (also referred to as "blanked") during the scan time of the first twenty-one scan lines so that the electron beam does not generate a visible line from the bottom of the screen to the top of the screen when being returned to the top of the screen. The first twenty-one scan lines are commonly referred to as the "vertical blanking interval" lines (or VBI lines).

The odd scan lines of the frame (i.e., frame line 1, frame line 3, etc.) are received first and are referred to as the "odd field". The first twenty-one of these odd lines are the VBI lines. These first twenty-one lines synchronize the television receiver for the subsequent scanning of the horizontal scan lines of a viewable portion 12 of the frame 10. During each horizontal scan line, the electron beam scans from left to right across the screen. When the electron beam reaches the right edge of the screen, the electron beam is returned to the left edge of the screen in preparation for the scanning of the next scan line. After the scanning of each odd scan line in viewable portion 12, the electron beam is "blanked" as the electron beam is returned to left edge of the screen in preparation for the start of the next scan line. This blanking time is referred to as the "horizontal blanking interval" of the frame, which is indicated by a region 14 in FIG. 1.

After the last odd scan line has finished, the even scan lines of the frame (i.e., frame line 2, frame line 4, etc.) are received and are referred to as the "even field". As with the odd field discussed above, the first twenty-one scan lines of the even field are VBI lines. The electron beam is blanked during the scanning of the even VBI lines such that the electron beam can be returned to the top of the screen without generating a line on the screen. After the scanning of all the even VBI lines, the even scan lines of viewable portion 12 are scanned in a manner similar to the scanning of the odd scan lines discussed above. The viewable horizontal scan lines of the odd and even fields together cause the electron beam to scan across the screen of the television to create the viewable television image.

Generally, the entire vertical blanking interval is not required for vertical synchronization and returning the electron beam to the top of the screen. Typically, only VBI lines 1-9 of each field (i.e., the odd field and the even field) are used for these purposes. Thus, the remaining twelve VBI lines (lines 10-21) are available for communicating other information.

For example, VBI line 21 provides a low speed communication sub-channel (the "line 21 sub-channel"). Data is encoded in the line 21 sub-channel in accordance with the encoding technique set forth in EIA-608, which is reserved by the Federal Communication Commission (FCC) for captioning services. The line 21 sub-channel can transmit textual information, the current time, "V-chip" program rating codes, and closed captioning information. For example, a television receiver captures the closed captioning information and displays it as a text subtitle along with the television video to assist the hearing impaired.

VBI lines 10-20 are available for a higher-speed communication sub-channel for the communication of data. Data can be encoded in VBI lines 10-20 at a data rate sufficient to communicate web page content along with the television content being transmitted. The web page content is received and stored locally in the television receiver for future access. Later, when the web page content is to be displayed at a particular time in the television video, a "trigger" that identifies the web page content (e.g., by file name) is broadcast to the television receiver. When the trigger is received, the associated web page content is retrieved from the local storage device and displayed on the television screen.

However, certain televisions do not support the transmission of data over the VBI lines as discussed above. Furthermore, certain broadcast systems (such as digitally compressed satellite feeds and digital cable systems) may prevent the VBI-based information from being delivered to capable receivers. Thus, an alternate system sends information and triggers using line 21 instead of the VBI lines. Typically, the information transmitted using line 21 is relatively short, such as a uniform resource locator (URL) identifying the location of web page content to be retrieved by a television receiver (e.g., via a telephone line or other network connection). Since the television broadcaster transmits the same signal to many televisions, the broadcaster cannot tailor its signal to match the capabilities of a particular television receiver.

The system described herein addresses these and other problems by providing a television broadcast method and system that supports the transmission of data to various types of television receivers.

SUMMARY

The method and apparatus for retrieving data from a broadcast signal described herein allows a single television broadcast signal to support multiple types of television receivers. Different methods are used to communicate data and data identifiers along with the television program content, thereby allowing different types of television receivers to retrieve data from the broadcast signal.

In one implementation, a broadcast signal is received that includes a data identifier that identifies data associated with the broadcast signal. The broadcast signal also includes the data associated with the broadcast signal encoded in the broadcast signal. The data associated with the broadcast signal includes an indicator to ignore the data identifier contained in the broadcast signal. The procedure decodes the data encoded in the broadcast signal and ignores the data identifier contained in the broadcast signal.

In another embodiment, the indicator to ignore the data identifier contained in the broadcast signal includes a time period during which the data identifier should be ignored.

In a particular embodiment, the broadcast signal includes a broadcast image and the data identifier is broadcast in line twenty-one of the broadcast image.

In particular embodiments, the data associated with the broadcast signal is encoded in vertical blanking interval lines of the broadcast image.

DETAILED DESCRIPTION

The method and apparatus for retrieving data from a broadcast signal described herein provides support for multiple types of television receivers using a single television broadcast signal. Alternate mechanisms are provided to communicate data and data identifiers along with the television program content. Using a first mechanism, a data identifier is transmitted in scan line twenty-one. This data identifier identifies the location of data associated with the television program. Another mechanism reads the data associated with the television program from the vertical blanking interval lines.

Various examples and embodiments are described herein with reference to television broadcast signals. However, the systems and procedures described herein can be used with any type of broadcast signal, and are not limited to television signals. Furthermore, examples contained herein describe the systems and procedures with respect to a television system. However, the teachings of the present invention can be applied to any type of display device, such as direct view televisions, projection television systems, and flat panel displays.

Figure 1:
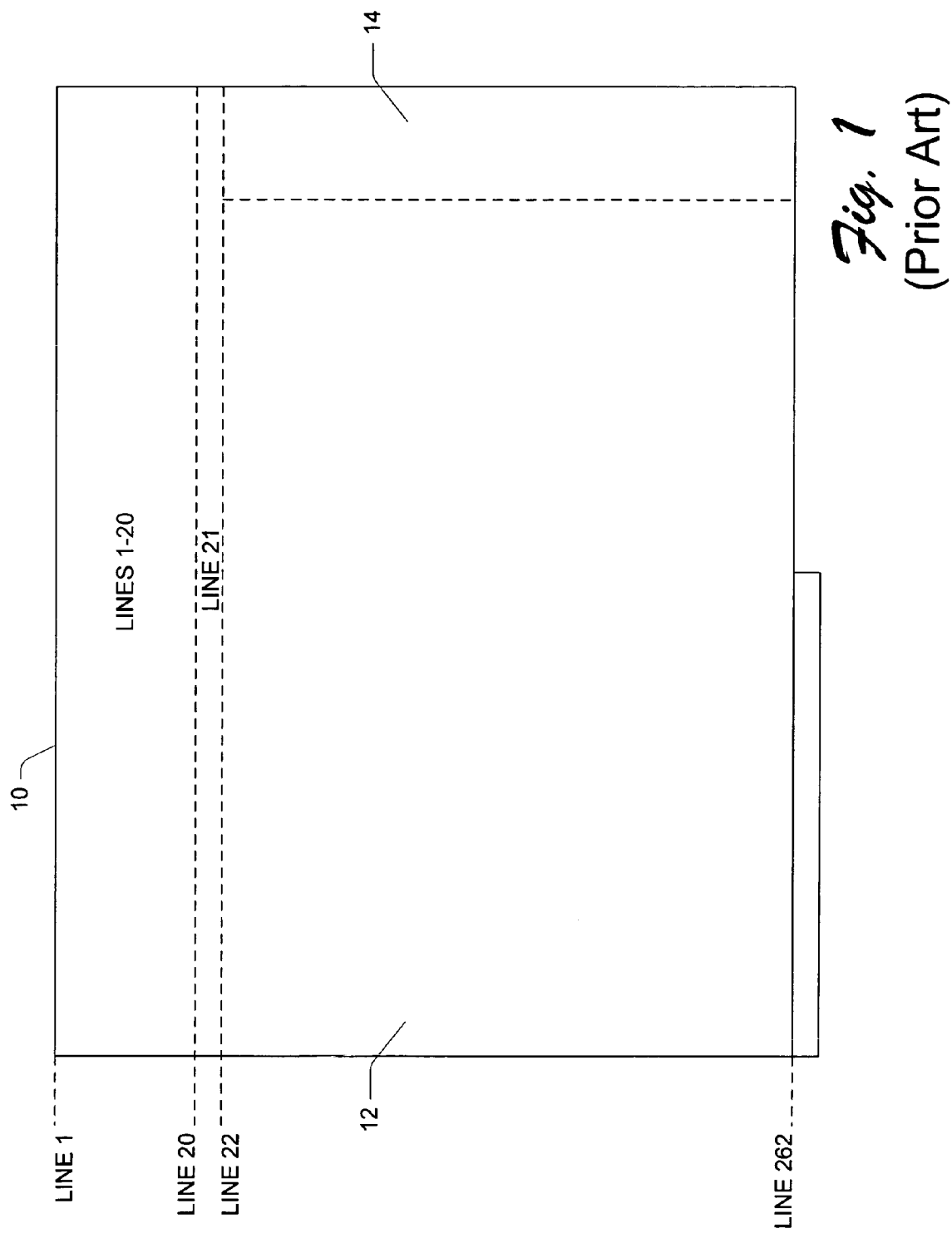
FIG. 1 illustrates an example television broadcast frame in accordance with the NTSC standard.
Figure 2:
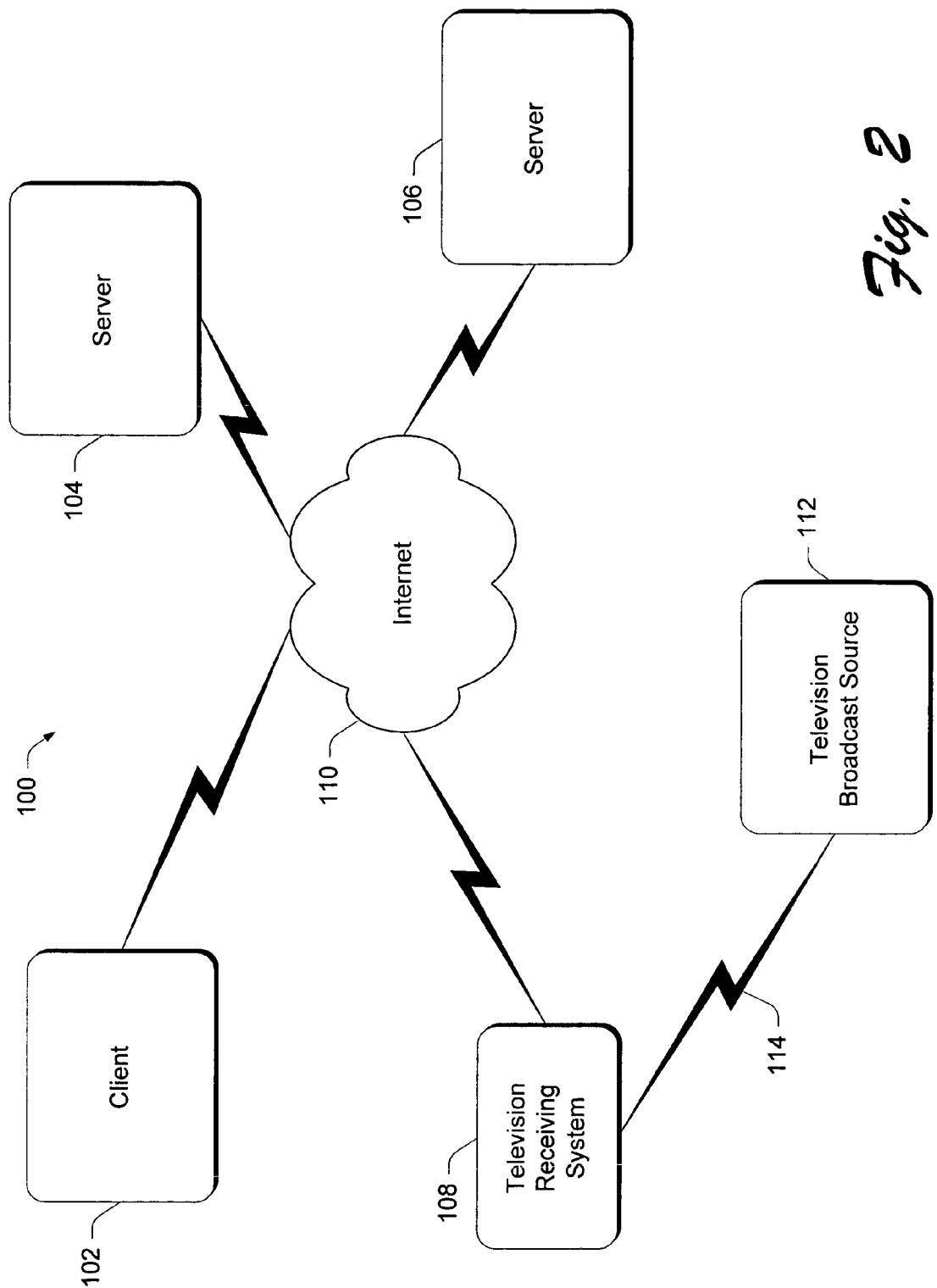
FIG. 2 illustrates an exemplary network environment in which a television receiving system receives and transmits data across the Internet and receives television signals from a television broadcast source.

FIG. 2 illustrates an exemplary network environment 100 in which a television receiving system 108 transmits and receives data across the Internet 110 and receives television signals from a television broadcast source 112. A client 102, servers 104 and 106, and the television receiving system 108 are coupled to one another through the Internet 110. Television receiving system 108 is capable of receiving various types of data from one or more devices coupled to the Internet 110. Television receiving system 108 is also coupled to the television broadcast source 112, which broadcasts television signals via a communication link 114. Television receiving system 108 may receive television signals from source 112 via cable, satellite, microwave, computer network, terrestrial (over the air) broadcast, or any other communication medium. Although not shown in FIG. 2, television broadcast source 112 may have an associated server or other device coupled to the Internet 110, which allows the source 112 to broadcast television signals via one medium (e.g., cable) and transmit other data related to the television broadcast via the Internet 110. Alternatively, television broadcast source 112 may transmit television signals as well as other data related to the television signals via the Internet 110.

Figure 3:
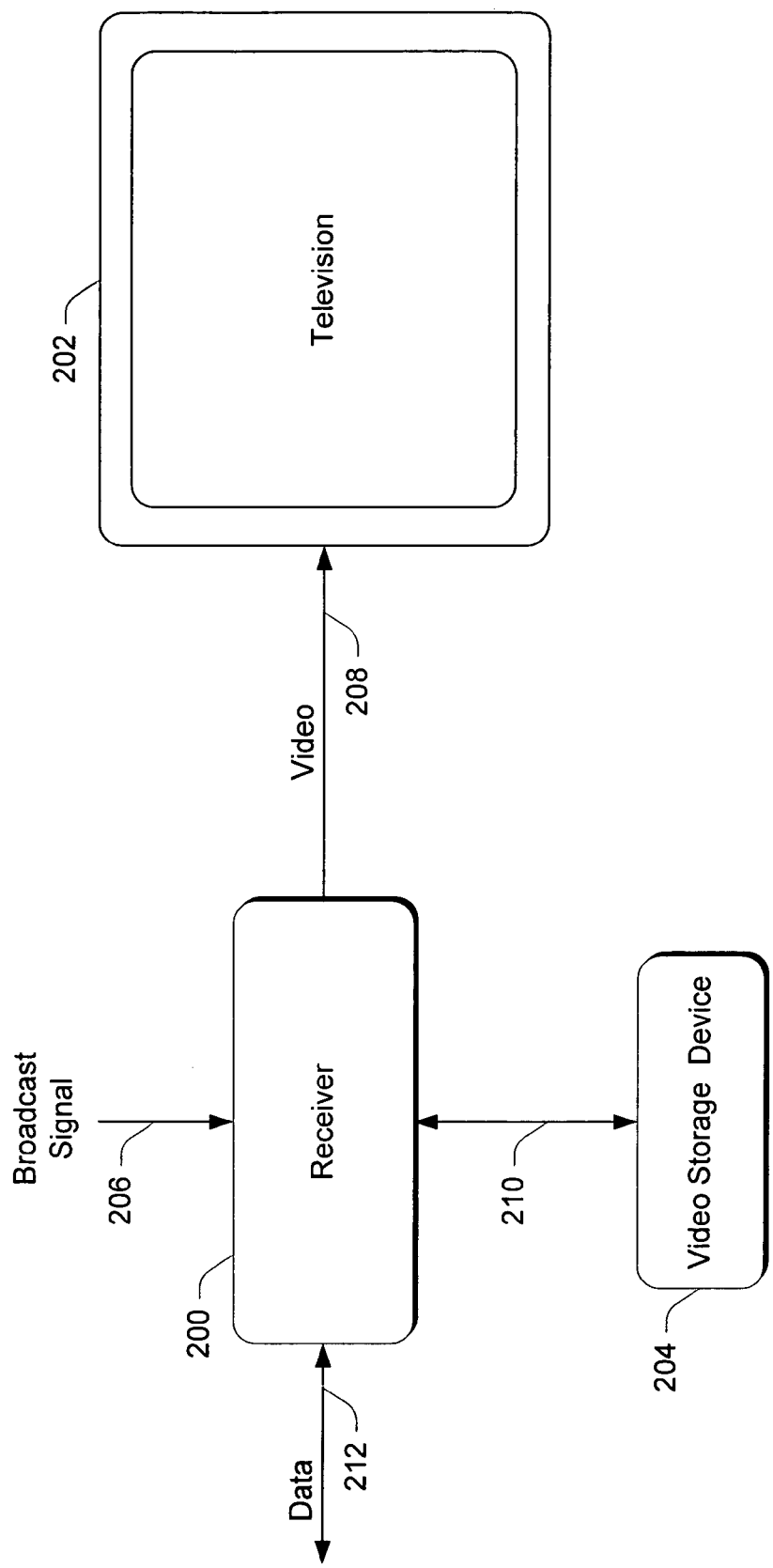
FIG. 3 illustrates an embodiment of a television receiving system.

FIG. 3 illustrates an embodiment of the television receiving system 108. A receiver 200, such as a set-top box, receives a broadcast television signal 206 from a television broadcast source (such as source 112 in FIG. 2). The receiver 200 communicates data bi-directionally on a data communication link 212. Data communication link 212 may use any type of communication medium and any communication protocol. In a particular embodiment, data communication link 212 is a telephone line that provides a data connection to the Internet or another data communication network. Receiver 200 is coupled to a video storage device 204, which stores television signals and other data. Receiver 200 is also coupled to a television 202 via a video communication link 208. Video communication link 208 may be a radio frequency (RF), s-video, composite video, component video, or other video link. Television 202 may be any type of display device or projection device using any type of display or projection technology, including projection display systems and flat panel displays.

Receiver 200 receives broadcast television signal 206 and displays the received signal on television 202 and/or stores the received signal on video storage device 204. Alternatively, receiver 200 may receive television signals via data communication link 212. Furthermore, additional information associated with the received television signal may be received and/or transmitted on data communication link 212. For example, web page content associated with a particular television broadcast may be sent via communication link 212 or encoded into the broadcast itself. Although receiver 200, television 202, and video storage device 204 are shown in FIG. 3 as separate devices, any two or more of these devices may be combined into a single device.

Figure 4:
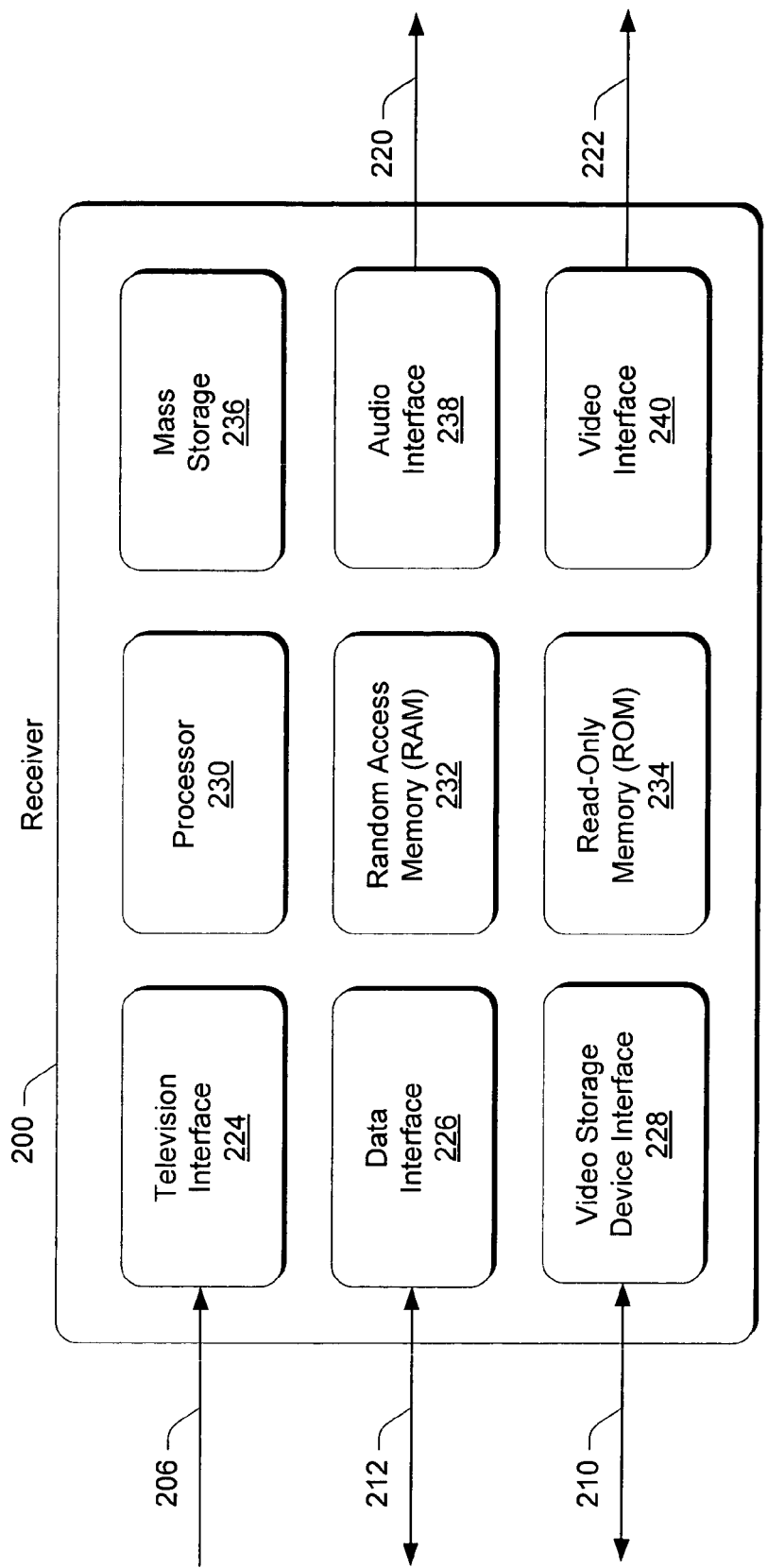
FIG. 4 is a block diagram of a receiver capable of receiving television signals and network data, and generating video signals for display on a television.

FIG. 4 is a block diagram of the receiver 200 shown in FIG. 3. As discussed above, receiver 200 is capable of receiving television signals and network data and generating video signals for display on a television. Additionally, the receiver 200 can be used, for example, to perform various procedures necessary to record and play back television programs and allow a viewer to interact with the source of a television broadcast (e.g., via a data communication network). Receiver 200 includes a television interface 224, such as a television tuner, which receives the broadcast television signal 206 from a television broadcast source. A data interface 226 transmits and receives data across communication link 212, which is typically coupled to a data communication network such as the Internet. Data interface 226 typically includes a modem or other bi-directional data communication device. Receiver 200 also includes a video storage device interface 228, which communicates with one or more video storage devices, such as device 204 shown in FIG. 3, via communication link 210.

Receiver 200 includes one or more processors 230, a random access memory (RAM) 232, a read-only memory (ROM) 234, and a mass storage device 236. Processor 230 is capable of implementing the various procedures and operations discussed herein. RAM 232 and mass storage device 236 provide for the storage of data, instructions, and other information used by processor 230 during the operation of receiver 200. ROM 234 stores various parameters and basic operating instructions used, for example, by processor 230.

An audio interface 238 communicates audio data across an audio communication link 220. Similarly, a video interface 240 communicates video data across a video communication link 222. In a particular embodiment, audio interface 238 and video interface 240 are combined into a single audio/video interface which communicates audio and video information across an audio/video communication link. Although not shown in FIG. 4, receiver 200 may also include a remote control interface that allows a television viewer to control the functions of the receiver using a handheld remote control device.

Generally, the processor 230 of receiver 200 is programmed by means of instructions stored at different times in various computer-readable storage media of the receiver, such as RAM 232 and mass storage 236. The system described herein includes various types of computer-readable storage media when such media contains instructions or programs for implementing the steps described herein in conjunction with a processor. The system also includes the receiver itself when programmed according to the methods and techniques described herein. Alternatively, these systems can be implemented in hardware or a combination of hardware, software, and/or firmware. For example, one or more application specific integrated circuits (ASICs) could be programmed to carry out the systems and procedures discussed herein.

As used herein, a television program is typically defined as a particular television show or event (such as a sporting event or a concert). However, a television program may refer to a portion of an event (e.g., the first hour of a concert or the first part of a multi-part program). A television program may have a known length (such as a movie or a weekly episode of a pre-recorded program) or unknown length, such as a sporting event.

As discussed above, different methods are used to encode data into a television broadcast signal. A first method uses line twenty-one of the television signal to broadcast data, such as a URL or other data identifier, which is related to the current television program or an upcoming television program. The URL or other data identifier broadcast with the television signal is commonly referred to as a "trigger". After receiving the URL, the television receiver (e.g., a set top box) contacts the web site associated with the URL and retrieves the web page content from the web site. Typically, the URL (or other identifier) is broadcast at periodic intervals using line twenty-one.

Another method of encoding data into a television broadcast signal uses the VBI lines to transmit data associated with the television program currently being broadcast or scheduled to be broadcast in the future. The data transmitted using the VBI lines may include, for example, web page content from a web server. In one embodiment, the data includes a session description protocol (SDP) announcement that identifies the content and attributes of the data that follows. SDP is intended for describing multimedia sessions for the purposes of session announcement, session invitation, and other forms of multimedia session initiation. A multimedia session is a set of multimedia senders and receivers and the data streams flowing from senders to receivers. A multimedia conference (two or more communicating users) is an example of a multimedia session. A session announcement is a mechanism by which a session description is conveyed to users in a proactive fashion, i.e., the session description was not explicitly requested by the user. A session description is a format for conveying sufficient information to discover and participate in a multimedia session.

SDP includes a session name and purpose, time(s) the session is active, the media comprising the session, information to receive those media (addresses, ports, formats, etc.), information regarding the bandwidth to be used by the conference, and contact information for the person responsible for the session. Generally, SDP conveys sufficient information to allow a user to join a session and to announce the resources to be used. For example, SDP may include the type of media (video, audio, etc.), the transport protocol, and the format of the video (such as MPEG video). If working with a multicast stream, SDP also conveys the multicast address for the media and the transport port for the media. If working with a unicast session, SDP conveys the remote address for the media, and the transport port for the contact address. Additional information regarding SDP is available from the Multiparty Multimedia Session Control (MMUSIC) working group of the Internet Engineering Task Force (specifically, a document identified as "Request for Comments: 2327" dated April 1998, and any future versions thereof).

Older television receivers or set top boxes may only support the first method, receiving data (e.g., triggers) from line twenty-one, but do not support the identification of data contained in the VBI lines. Since these older devices cannot identify data contained in the VBI lines, they use the triggers broadcast in line twenty-one to identify the source of data to be downloaded, for example, from a web server. Newer television receivers or set top boxes may support both the first method (i.e., line twenty-one triggers) and the second method (i.e., transmitting data in the VBI lines).

To provide support for both older television receivers and newer television receivers, television broadcasters may use both methods discussed above to communicate data along with a television signal. For example, line twenty-one contains a URL to a particular web site, such as: www.acme.com, which causes the television receiver to retrieve the web page content from the web site. Additionally, the web page content is broadcast in the VBI lines for the benefit of those television receivers capable of retrieving data from the VBI lines. In this example, the data transmitted in the VBI lines is the same as the data pointed to by the URL. Therefore, it is not necessary for a television receiver to read the data from the VBI lines and respond to the line twenty-one trigger, because the two sets of data are identical. In this situation, it is necessary to instruct television receivers capable of reading the data in the VBI lines to ignore the triggers received in line twenty-one, thereby avoiding the retrieval of redundant data. To instruct television receivers to ignore the line twenty-one triggers, a new attribute is used in the SDP announcement that identifies the URL or other data identifiers that should be ignored. Additionally, the attribute identifies the time period during which the television receiver should ignore the particular line twenty-one triggers. The following is an example SDP announcement that instructs television receivers to ignore line twenty-one triggers associated with the www.acme.com web site.

a=tve-ignore: www.acme.com/* [t=30]

In this SDP announcement, "a" indicates an arbitrary attribute and "tve-ignore" indicates that the attribute is instructing the television receiver to ignore certain line twenty-one triggers. The final portion of the SDP announcement indicates the line twenty-one triggers to ignore. The "*" character is a wildcard character. In this example, any line twenty-one trigger identifying a URL beginning with "www.acme.com" will be ignored by the television receiver for the time period stated (e.g., for the next thirty minutes).

In another example, the SDP announcement is as follows:

a=tve-ignore: *www.hdd.com/* [t=12:00,13:00]

In this SDP announcement, any line twenty-one trigger identifying a URL containing "www.hdd.com" will be ignored by the television receiver for the time period stated (e.g., between noon and 1:00 p.m.). The two "*" characters cause the television receiver to ignore all line twenty-one triggers that contain "www.hdd.com" anywhere in the trigger.

Since the SDP announcement is sent in the VBI lines, it does not affect the operation of older television receivers that cannot read data from the VBI lines. Thus, the older television receivers will not ignore the line twenty-one triggers because the SDP announcement is not understood by the older receivers.

Figure 5:
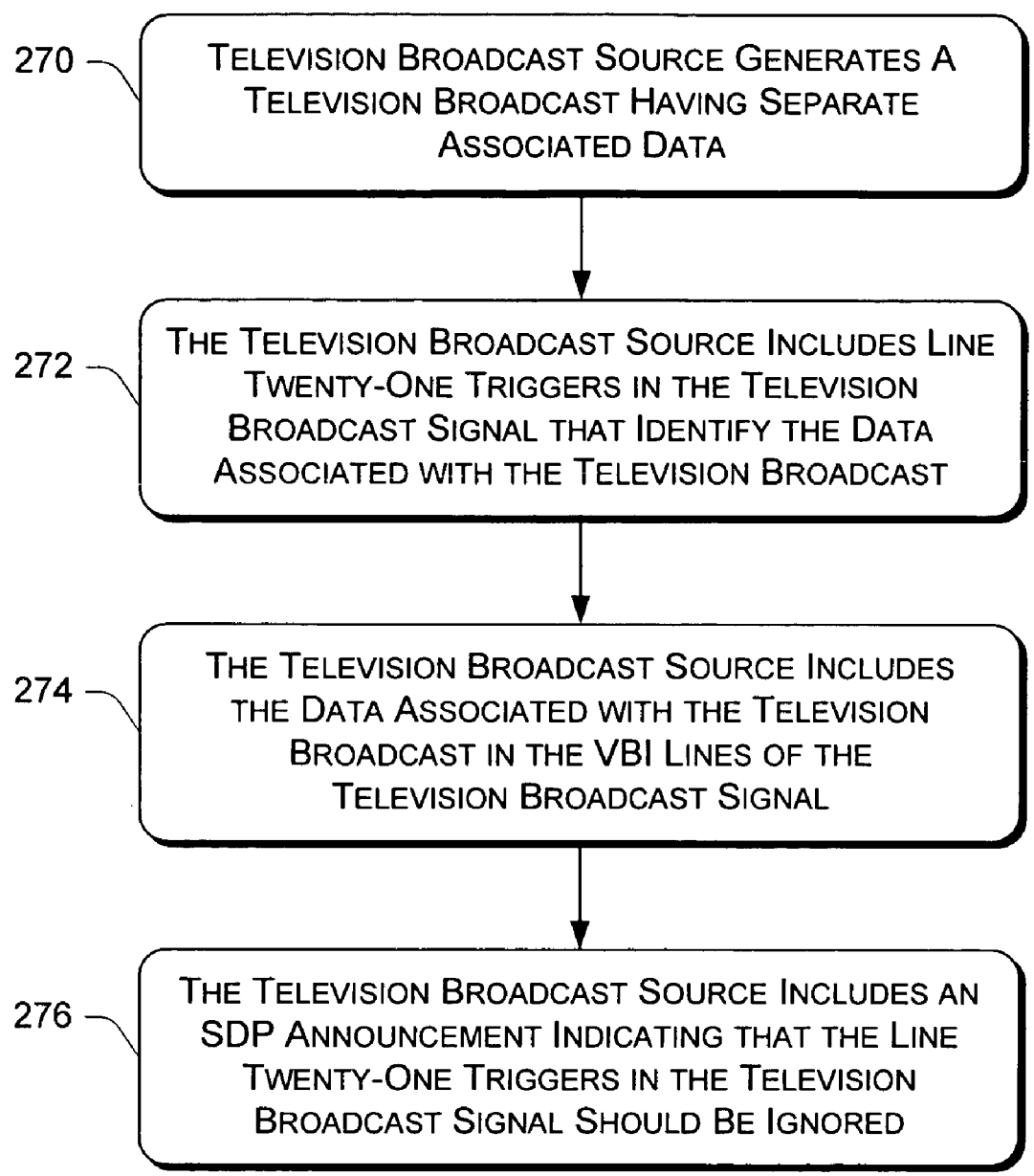
FIG. 5 is a flow diagram illustrating a procedure for generating a broadcast television signal that includes data and data identifiers.

FIG. 5 is a flow diagram illustrating a procedure for generating a broadcast television signal that includes data and data identifiers. A television broadcast source generates a television broadcast that has separate associated data (block 270). For example, one or more web pages may be associated with a particular television broadcast. These web pages provide, for example, additional information about the television program and/or provide an opportunity for a viewer to activate an interactive television mode. The television broadcast source includes encoded line twenty-one triggers in the television broadcast signal (block 272). The line twenty-one triggers identify the data associated with the television broadcast. The television broadcast source also includes encoded data associated with the television broadcast in the VBI lines of the television broadcast signal (block 274). Additionally, the television broadcast source includes an SDP announcement of the type discussed above to indicate that the line twenty-one triggers in the television broadcast signal should be ignored (block 276). Since the television broadcast signal contains both the line twenty-one triggers and the data in the VBI lines, this single television broadcast signal supports both older television receivers and newer television receivers.

Figure 6:
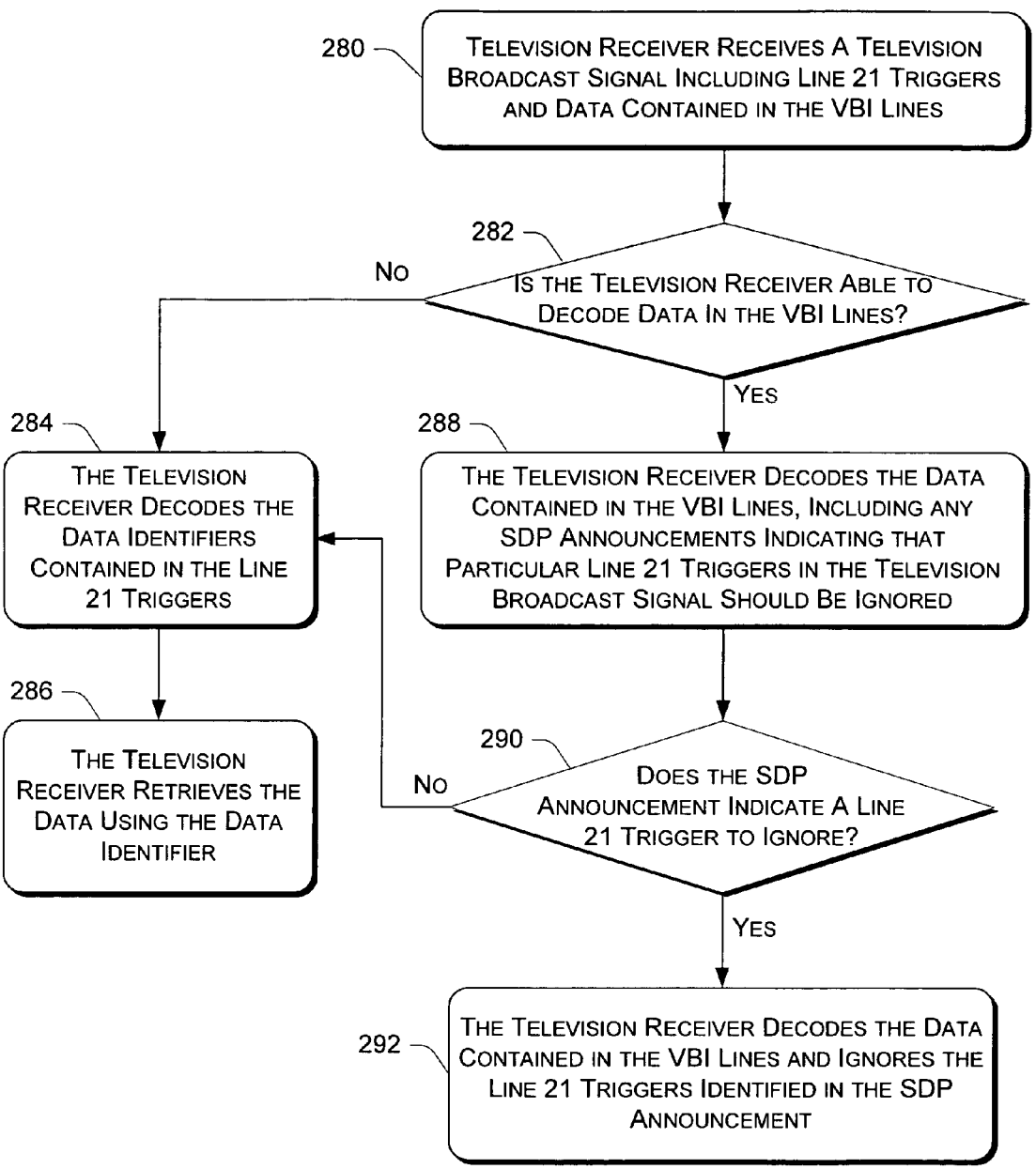
FIG. 6 is a flow diagram illustrating a procedure for decoding information contained in a broadcast television signal.

FIG. 6 is a flow diagram illustrating a procedure for decoding information contained in a broadcast television signal. In this example, the broadcast television signal contains both line twenty-one triggers identifying a set of data and the data itself, which is transmitted in the VBI lines. A television receiver receives the broadcast television signal including the line twenty-one triggers and the data contained in the VBI lines (block 280). The procedure then determines whether the television receiver is able to decode data in the VBI lines (block 282). If not, the procedure branches to block 284 where the television receiver decodes the data identifiers contained in the line twenty-one triggers. The television receiver then retrieves the data using the data identifier (block 286).

If the television receiver is capable of decoding data in the VBI lines, then the television receiver decodes that data, which may include one or more SDP announcements indicating that particular line twenty-one triggers in the television broadcast signal should be ignored (block 288). As discussed above, the SDP announcement may include a particular time during which the line twenty-one triggers should be ignored. Block 290 determines whether any received SDP announcements indicate a line twenty-one trigger to ignore. If not, the procedure branches to block 284, where the television receiver decodes the data identifiers contained in the line twenty-on triggers. If an SDP announcement indicates a line twenty-one trigger to ignore, then the television receiver decodes the data contained in the VBI lines and ignores the line twenty-one triggers identified in the SDP announcement (block 292).

Thus, a system has been described that allows a single television broadcast signal to support multiple types of television receivers by providing alternate mechanisms to communicate data and data identifiers along with the television program content. Further, television receivers capable of reading data from both the VBI lines and from line twenty-one triggers are instructed to ignore line twenty-one triggers that contain redundant data.

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

The invention claimed is:

1. An apparatus comprising:
    means for receiving a broadcast signal including a data identifier that identifies data associated with the broadcast signal, wherein the broadcast signal further includes the data associated with the broadcast signal encoded in the broadcast signal, and wherein the data associated with the broadcast signal includes an indicator to ignore the data identifier contained in the broadcast signal;
    means for decoding the data encoded in the broadcast signal; and
    means for ignoring the data identifier contained in the broadcast signal.

2. An apparatus as recited in claim 1 wherein the means for ignoring the data identifier contained in the broadcast signal ignores the data identifier if the data identifier matches another data identifier associated with the indicator.

3. An apparatus as recited in claim 1 wherein the indicator to ignore the data identifier contained in the broadcast signal includes a time period during which the data identifier should be ignored.

4. An apparatus as recited in claim 1 wherein the broadcast signal includes a broadcast image, and wherein the data identifier is broadcast in line twenty-one of the broadcast image.

5. An apparatus as recited in claim 1 wherein the data identifier identifies a data source which stores the same data that is encoded in the broadcast signal.

6. An apparatus as recited in claim 1 wherein the broadcast signal includes a broadcast image, and wherein the data associated with the broadcast signal is encoded in vertical blanking interval lines of the broadcast image.

7. An apparatus comprising:
    means for identifying data associated with a television broadcast;

means for generating a television broadcast signal that includes a data identifier that identifies the data associated with the television broadcast and includes the data associated with the television broadcast, wherein the data associated with the broadcast signal includes an indicator to ignore the data identifier contained in the broadcast signal; and means for transmitting the television broadcast signal to a plurality of television receivers.

8. An apparatus as recited in claim 7 wherein the data identifier is contained in line twenty-one of a broadcast image.

9. An apparatus as recited in claim 7 wherein the data identifier identifies a data source which stores the same data that is included in the broadcast signal.

10. An apparatus as recited in claim 7 wherein the data that is included in the broadcast signal is contained in vertical blanking interval lines of a broadcast image.

11. One or more computer-readable media having stored thereon a computer program that, when executed by one or more processors, causes the one or more processors to:

receive a television broadcast signal that includes a data identifier that identifies data associated with the broadcast signal, the data identifier being broadcast in line twenty-one of a broadcast image, the broadcast signal further includes the data associated with the broadcast signal encoded in vertical blanking interval lines of the broadcast image, and wherein the data associated with the broadcast signal includes an indicator to ignore the data identifier contained in the broadcast signal;

decode the data encoded in the broadcast signal; and ignore the data identifier contained in the broadcast signal.

12. One or more computer-readable media as recited in claim 11 wherein the indicator to ignore the data identifier contained in the broadcast signal includes an associated time period during which the data identifier should be ignored.

13. One or more computer-readable media as recited in claim 11 wherein the data identifier identifies a data source which stores the same data that is encoded in the broadcast signal.

14. One or more computer-readable media having stored thereon a computer program that, when executed by one or more processors, causes the one or more processors to:

identify data associated with a television broadcast;

generate a television broadcast signal that includes a data identifier that identifies the data associated with the television broadcast and includes the data associated with the television program, wherein the data associated with the broadcast signal includes an indicator to ignore the data identifier contained in the broadcast signal; and transmit the television broadcast signal to a plurality of television receivers.

15. One or more computer-readable media as recited in claim 14 wherein the data identifier is contained in line twenty-one of a broadcast image.

16. One or more computer-readable media as recited in claim 14 wherein the data identifier identifies a data source which stores the same data that is included in the broadcast signal.

17. One or more computer-readable media as recited in claim 14 wherein the data that is included in the broadcast signal is contained in vertical blanking interval lines of a broadcast image.

18. A system comprising:

a memory device; and a processor coupled to the memory device, wherein the processor is configured to:

identify data associated with a television broadcast;

generate a television broadcast signal that includes a data identifier that identifies the data associated with the television broadcast and includes the data associated with the television program, wherein the data associated with the broadcast signal includes an indicator to ignore the data identifier contained in the broadcast signal; and transmit the television broadcast signal to a plurality of television receivers.

19. A system as recited in claim 18 wherein the data identifier is contained in line twenty-one of a broadcast image.

20. A system as recited in claim 18 wherein the data identifier identifies a data source which stores the same data that is included in the broadcast signal.

21. A system as recited in claim 18 wherein the data that is included in the broadcast signal is contained in vertical blanking interval lines of a broadcast image.

* * * * *